United States Patent [19]

Finlay et al.

[11] 4,099,123
[45] Jul. 4, 1978

[54] ELECTRICAL MULTI-CHANNEL SIGNAL TRANSMISSION SYSTEMS

[75] Inventors: Edward W. Finlay, Agincourt; John Cappon, Willowdale, both of Canada

[73] Assignee: Premier Cablevision Ltd., Vancouver, Canada

[21] Appl. No.: 725,503

[22] Filed: Sep. 22, 1976

Related U.S. Application Data

[63] Continuation of Ser. No. 526,676, Nov. 25, 1974, abandoned.

[30] Foreign Application Priority Data

Oct. 4, 1974 [CA] Canada .................................. 210805

[51] Int. Cl.$^2$ .............................................. H04B 3/50
[52] U.S. Cl. .................................... 325/308; 358/86
[58] Field of Search .................. 325/308, 309; 358/86

[56] References Cited

U.S. PATENT DOCUMENTS 3,665,316  5/1972  Jeffers ..................... 325/308
3,898,566  8/1975  Switzer et al. ............ 325/308

OTHER PUBLICATIONS

Powers, "Channels, Channels ———and more channels" report presented at NCTA convention, Chicago, Ill. 5/1972.
Shekel, "Freq. Band Assignments Free of Second Order Beat Interfence", proceedigs of IEEE, vol. 58, No. 7, 7/1970.
Neal, "A Consumer-Enconomics View of Proposed Catv. Channel Assignment Plans, GTE Sylvania, Inc. 1/1973.

Primary Examiner—Robert L. Griffin
Assistant Examiner—Jin F. Ng

[57] ABSTRACT

In an electrical multi-channel signal transmission system having channels with signal carriers of predetermined frequencies, each frequency is an integral multiple of a constant which is a measure of frequency spacing between channels with the addition or subtraction of an integral multiple of one or more other constants. The integral multiples of the one or more other constants are selected to cause the frequencies of significant intermodulation products produced by simultaneous treatment of carriers by electrical components, such as amplifiers, to be equal to other carrier frequencies. The frequencies are obtained from a plurality of oscillators with frequencies related to the constants. The invention is especially useful with cable television systems transmitting programs on low, mid and high band channels.

8 Claims, 5 Drawing Figures

ELECTRICAL MULTI-CHANNEL SIGNAL TRANSMISSION SYSTEMS

CROSS-REFERENCE TO RELATED APPLICATION

This application is a continuation of our United States application Ser. No. 526,676 filed Nov. 25, 1974, now abandoned.

BACKGROUND OF THE INVENTION

This invention relates to electrical multi-channel signal transmission systems, in which different signals are transmitted by carriers (i.e. carrier waves) with different frequencies.

In practice, when transmitting such signals from one place to another, whether through the atmosphere and/or along wires, it is usually necessary to pass the carriers, with their signals, through non-linear electrical devices, which cause intermodulation products (often known as beats) to be produced by interaction between the carriers. Such non-linear electrical devices may for example be amplifiers. These intermodulation products may interfere with the signals carried by other carriers, thereby rendering clear reception of the signals impossible.

One well known example of a transmission system in which such problems arise is in the system known as cable television, in which television programs being transmitted through the atmosphere are picked up by a sophisticated antenna at a central station and, after suitable processing including amplification, are transmitted by cable to individual subscribers. The advantage of such a system is that the subscribers can receive television programs from places which are too far away from the subscriber to enable the programs to be picked up by a simple antenna of the kind normally found on a domestic television receiver. Processing of the signals and their carriers at the central station, and perhaps also at sub-stations, includes their treatment by non-linear electrical devices, such as certain kinds of amplifiers, which cause intermodulation products to be produced, with consequent likelihood of interference, as previously mentioned.

The problem could be avoided if the frequencies of the various carrier waves were allocated in such a manner that the intermodulation products were not of such frequencies as to produce unwanted interference with other carrier frequencies. For example, if each carrier frequency was an integral multiple of the difference in frequency between each carrier in the series, the significant intermodulation products would be at the frequencies of other carriers, and hence would not be detected as modulation by the signal reception equipment. This is known as a harmonically related carrier system. However, in many existing transmission systems of this type, for example systems for transmitting radio and television programs, the carrier frequencies have been established for many years, and it is not practically possible to change the carrier frequencies at the original transmitting station.

It has been previously proposed to avoid the problem found with existing transmission systems by receiving the carriers, and of course the signals carried thereby, on their original frequencies at a central station, and re-transmitting the signals on harmonically related carriers, which are obtained from a common frequency source. However, certain difficulties are imposed by this method. For example, domestic television receivers can only be tuned to certain selected channels, that is to say to only receive carriers and their signals at certain selected frequencies, since they only have a main tuner with pre-set positions corresponding to the frequencies of the carriers that the television set is intended to receive, and it is not practically possible to manufacture a main tuner with pre-set positions which correspond exactly to the carrier frequencies, since in practice such frequencies vary from time to time about a fixed value. The receivers are therefore also provided with a fine tuner, which can be adjusted to provide fine tuning when the main tuner has been adjusted to a pre-set position. The main tuner is set for adjustment to the frequencies at which the various carriers are originally transmitted, such frequencies having been established many years ago, as previously mentioned. If the signals, that is to say the television programs, are re-transmitted on harmonically related carriers, it is found that it is not possible to satisfactorily tune all domestic television receivers to the new carrier frequencies, because the new carrier frequencies are so far apart from the original carrier frequencies, for which the main tuner is pre-set, that the fine tuner does not have a sufficiently wide range of adjustment to enable the new carrier frequencies to be received.

Another way of overcoming the problem would be to eliminate non-linear electrical devices, such as single-ended amplifiers, i.e. non push-pull amplifiers, with which many existing cable television systems are equipped. Though it is possible to reduce the problem by replacing the single-ended amplifiers by amplifiers of the push-pull kind, the cost of such a procedure is undesirably high.

SUMMARY OF THE INVENTION

It is therefore an object of the invention to provide a transmission system in which the carrier frequencies, while not harmonically related, are judiciously selected to reduce signal interference by intermodulation products to a tolerable level.

According to the invention, each carrier frequency is expressed as an integral multiple of a constant which is a measure of the frequency spacing plus an amount (which may be positive or negative) selected such that the significant intermodulation products are coincident in frequency with other carrier frequencies. The amount may be an integral multiple of another constant, or may be one of two constants with their sum or difference. In the former case, the values of the constants may be found by selecting two carrier frequencies, and solving the resultant equations accordingly. In the later case, the values of the constants may be found by selecting three carrier frequencies, and solving the resulting equations accordingly. The values of the constants may then be used as the frequencies of oscillators in an appropriate synthesizer to produce the other carrier frequencies.

The invention enables the new frequencies to be selected in such a manner as to produce relatively small shifts between the original and new carrier frequencies.

The invention is especially useful in cable television systems which pick up and transmit television programs and possibly other kind of signals in the standard low, mid and high television carrier bands, in that it enables second order intermodulation products to be controlled in such a manner that the mid band channels can be used to a greater extent than before.

The two or three selected frequencies, from which the other frequencies are synthesized, may be original channel frequencies. This enables these frequencies to be phase locked to off-air carriers where ambient pick up may produce a interference problem.

It is possible with a multi-channel band to lock some channels, but not others, so as to obtain an optimum arrangement in which, on the one hand the problem of ambient reception is minimized, and on the other hand the problem of shift between original and new frequencies is minimized.

DESCRIPTION OF THE PREFERRED EMBODIMENTS

Figure 1:
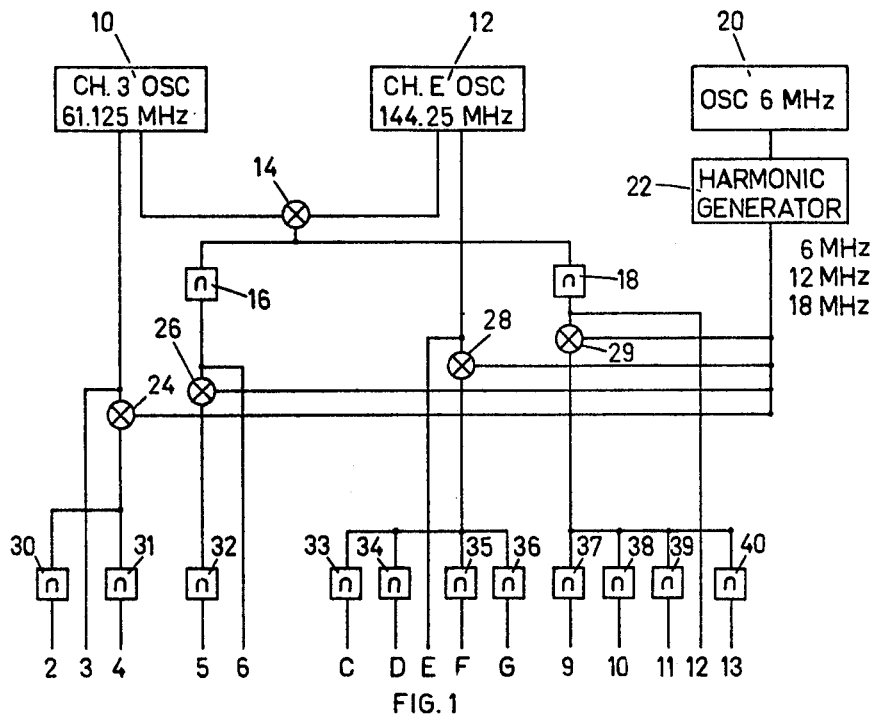
FIG. 1 is a block diagram showing how the carrier frequencies are converted, according to one embodiment of the invention, where no phase lock to off-air signals is required.

As indicated previously, the invention is especially useful with cable television systems. Table 1 which follows shows in the first two columns the standard frequencies in megahertz of the television channels in the low low band, the high low band, the mid band and the high band. The third column shows the channel frequency in standard analytic form and the fourth column, the assigned channel frequencies in accordance with the invention also in analytic form. The derivation of these forms will be more fully explained later.

TABLE 1

|  | Channel | Freq. MHz | Standard | New Assignment |
|---|---|---|---|---|
| Low Low Band | 2 | 55.25 | $9x + 5y$ | $9x + 5y$ |
|  | 3 | 61.25 | $10x + 5y$ | $10x + 5y$ |
|  | 4 | 67.25 | $11x + 5y$ | $11x + 5y$ |
| High Low Band | 5 | 77.25 | $13x - 3y$ | $13x - 3y$ |
|  | 6 | 83.25 | $14x - 3y$ | $14x - 3y$ |
| Mid Band | C | 133.25 | $22x + 5y$ | $22x + 2y$ |
|  | D | 139.25 | $23x + 5y$ | $23x + 2y$ |
|  | E | 145.25 | $24x + 5y$ | $24x + 2y$ |
|  | F | 151.25 | $25x + 5y$ | $25x + 2y$ |
|  | G | 157.25 | $26x + 5y$ | $26x + 2y$ |
|  | H | 163.25 | $27x + 5y$ | $27x + 2y$ |
|  | I | 169.25 | $28x + 5y$ | $28x + 2y$ |
| High Band | 7 | 175.25 | $29x + 5y$ | $29x + 7y$ |
|  | 8 | 181.25 | $30x + 5y$ | $30x + 7y$ |
|  | 9 | 187.25 | $31x + 5y$ | $31x + 7y$ |
|  | 10 | 193.25 | $32x + 5y$ | $32x + 7y$ |
|  | 11 | 199.25 | $33x + 5y$ | $33x + 7y$ |
|  | 12 | 205.25 | $34x + 5y$ | $34x + 7y$ |
|  | 13 | 211.25 | $35x + 5y$ | $35x + 7y$ |

For the purposes of this specification, each group of channels is defined as a "set" and the term "adjacent" refers to channels within a set.

Channels A and B are not included in deference to present Department of Communications policy which restricts their use in Canada. However, the invention is equally applicable to such channels.

Many existing cable television systems were constructed to process only the low band and high band channels, and as previously mentioned, many existing systems were equipped with broad band singleended amplifiers. When the standard low and high band television carriers are applied to such amplifiers, intermodulation products are produced which appear in the mid band. In the past, this has not been a significant problem, since the mid band was not used for domestic television purposes. However, now that the mid band is being so used, the incorporation of mid band channels into existing cable television systems results in the intermodulation products mentioned becoming a significant problem. Further problems are also introduced because the amplification of mid band carriers by single-ended amplifiers also produces undesirable intermodulation products in the low and high bands. Such intermodulation products produce lines superimposed on a television picture, and these are clearly undesirable.

In its application to cable television, the present invention incorporates an appreciation that the most undesirable intermodulation products produced by the single-ended amplifiers are caused by second order sum and difference products between carriers in the various bands, and according to the invention various carrier frequencies can be reassigned to substantially eliminate the effect of such intermodulation products by ensuring that the frequencies of these products coincide with various re-assigned carrier frequencies, so that they are not detected as modulation in the receiving equipment.

Referring again to Table 1, the various channel frequencies are expressed in analytical form in the third column, according to the invention, in terms of constants $x$ and $y$, where $x$ equals 6 and $y$ equals 0.25. With the standard frequencies expressed in this form, it can be seen how amplification by single-ended amplifiers of low and high band carriers produces undesirable intermodulation products in the mid band, and that amplification of additional mid band carriers produces intermodulation products in the low and high bands. For example the sum product of channels 4 and 6 carriers has a sum of $25x + 2y$, which produces an undesirable intermodulation product within channel F, i.e. a $3y$ or 0.75 MHz beat will occur. Also, channel 10 and channel D carriers have a different product, $5y$, which produces an undesirable intermodulation product 1.25 MHz beat with channel 2 carrier.

According to the invention, the channel frequencies are reassigned by varying the integral multiple of the $y$ constant of the analytical expressions to the values as shown in column 4 to give the desired frequency congruence and substantially solve the problem. It will be seen that the channel 4 and channel 6 carriers now have a sum which is equal to channel F carrier, and that the channel 10 and channel D carriers now have a frequency difference which is equal to the channel 2 carrier.

The values of $x$ and $y$ can be found by solving two of the carrier equations simultaneously. This provides a great deal of flexibility, since the products of the equations can be selected to produce the least amount of shift from the standard carrier frequencies, or they can be chosen to allow locking onto off-air carriers, where ambient reception of these carriers by a domestic receiver may itself result in interference problems. This may happen when a transmitter on a particular channel is so near a receiver that the receiver receives the off-air signal from the transmitter as well as the signal received over the cable system. In this latter case, the frequency of the particular channel concerned may be used as the frequency of one of the basic oscillators. A further basic oscillator is of course required, owing to the presence of the two variables, i.e. $x$ and $y$, in the analytical expressions.

For example, if it is necessary to lock onto channel 6 and channel 11, each offset the standard 0.01 MHz, the frequencies of $x$ and $y$ can be found as follows:

Channel $11 = 33x + 7y = 199.26$ MHz

Channel $6 = 14x - 3y = 83.26$ MHz therefore,
$x$ equals 5.9929 MHz
$y$ equals 0.2135 MHz These values of $x$ and $y$ are then substituted in the re-assigned analytical expressions shown in column 4 of table 1, and the resulting re-assigned carrier frequencies are shown in the second table which follows:

TABLE 2

| Channel | Standard Frequency (MHz) | Re-assigned Frequency (MHz) | Frequency Deviation (KHz) |
|---|---|---|---|
| 2 | 55.25 | 55.0036 | 246 |
| 3 | 61.25 | 60.9965 | 253 |
| 4 | 67.25 | 66.9893 | 260 |
| 5 | 77.25 | 77.2671 | 17 |
| 6 | 83.26 | 83.26 | none |
| C | 133.25 | 132.2708 | 979 |
| D | 139.25 | 138.2635 | 986 |
| E | 145.25 | 144.2564 | 993 |
| F | 151.25 | 150.2495 | 1,000 |
| G | 157.25 | 156.2422 | 1,007 |
| H | 163.25 | 162.2351 | 1,015 |
| I | 169.25 | 168.2280 | 1,021 |
| 7 | 175.25 | 175.2884 | 38.5 |
| 8 | 181.25 | 181.2813 | 31.3 |
| 9 | 187.25 | 187.2742 | 24.2 |
| 10 | 193.25 | 193.2671 | 17.1 |
| 11 | 199.26 | 199.26 | none |
| 12 | 205.25 | 205.2529 | 2.9 |
| 13 | 211.25 | 211.2457 | 4.2 |

This second table also shows the frequency shift in column 4, that is to say the difference between the original carrier frequency and the re-assigned carrier frequency, for each channel. In the high and low bands, the shift is well within the fine tuning range of standard domestic receivers. A slightly greater shift is provided in the mid band channels, but this is not a practical problem since at the present time most domestic receivers are not equipped with mid band tuners, i.e. are not equipped to receive mid band channels, and consequently will in any event have to be used with an external converter which can incorporate its own fine tuner adequate to meet the shift. The external converter will for example simply convert the selected mid band channel into the carrier frequency of one of the channels which the receiver is equipped to receive, with the cable transmission on the channel frequency having of course been filtered out.

A further way of expressing the channel frequencies in analytical form, according to a second embodiment of the invention, is shown in the second column of table 3, which follows; where no phase-locking to off-air signals is required, even smaller frequency shifts off the standard carriers can be produced:

TABLE 3

| Channel | Equation | Re-assigned Frequency (MHz) | Frequency Deviation (KHz) |
|---|---|---|---|
| 2 | 9x + v | 55.125 | −125 |

TABLE 3-continued

| Channel | Equation | Re-assigned Frequency (MHz) | Frequency Deviation (KHz) |
|---|---|---|---|
| 3 | 10x + v | 61.125 | −125 |
| 4 | 11x + v | 67.125 | −125 |
| 5 | 13x + u − v | 77.125 | −125 |
| 6 | 14x + u − v | 83.125 | −125 |
| C | 22x + u | 132.250 | −1000 |
| D | 23x + u | 138.250 | −1000 |
| E | 24x + u | 144.250 | −1000 |
| F | 25x + u | 150.250 | −1000 |
| G | 26x + u | 156.250 | −1000 |
| H | 27x + u | 162.250 | −1000 |
| I | 28x + u | 168.250 | −1000 |
| 7 | 29x + u + v | 175.375 | +125 |
| 8 | 30x + u + v | 181.375 | +125 |
| 9 | 31x + u + v | 187.375 | +125 |
| 10 | 32x + u + v | 193.375 | +125 |
| 11 | 33x + u + v | 199.375 | +125 |
| 12 | 34x + u + v | 205.375 | +125 |
| 13 | 35x + u + v | 211.375 | +125 |

In this case, each carrier frequency is shown expressed in reassigned form in terms of three constants, namely $x$, $u$ and $v$. If $x$, $u$ and $v$ are given values of 6 MHz, 0.25 MHz, and 1.125 MHz, respectively, secondorder intermodulation may be avoided with a carrier shift of only 125 KHz in the standard twelve television channels. It can easily be seen that the frequency shifts for the low and high bands are a maximum of 125 KHz in contrast to the much higher maximum which occurs with channel 4 in the arrangement shown in the second table.

FIG. 1 shows how the various re-assigned channel frequencies can be produced in a master generator from the two initial oscillators, in conjunction with a third oscillator generating a carrier frequency of 6 MHz, which is a typical channel spacing.

The outputs of the oscillators 10, 12 are selected to be the re-assigned frequencies of channel 3 and channel E, 61.125 MHz and 144.250 MHz, respectively, and are combined in mixer 14 to produce a pair of frequencies, namely the sum and the difference of the two frequencies mixed, thereby producing frequencies of 205.375 MHz and 83.125 MHz respectively. These new frequencies are passed through band pass filters 16, 18, each of which pass a respective one of these two frequencies, filter 16 passing only the frequency of 83.125 MHz and filter 18 passing only the frequency of 205.375 MHz. It will be seen that these are the re-assigned frequencies of channels 6 and 12 respectively.

The output from the third oscillator 20 is passed through a harmonic generator 22 which produces frequencies of 6 MHz, 12 MHz and 18 MHz. The other channel frequencies are produced by appropriate mixing and filtering using the two oscillators 10, 12, the frequencies produced from filters 16, 18 and the various frequencies from the harmonic generator 2. As shown in FIG. 1, four more mixers 24, 26, 28 and 29 are provided, as well as appropriate filters 30–40 which filter out all except the required channel frequency in each case.

For example, mixer 24 is fed a 61.125 MHz signal from oscillator 10 and the signals from the harmonic oscillator 22. Of the various frequencies produced, only two of these frequencies are actually required, namely 61.125 MHz − 6 MHz, which is channel 2, 55.125 MHz, and 61.125 MHz + 6 MHz, which is channel 4, 67.125 MHz. Filter 30 therefore filters out all frequencies except 55.125 MHz for channel 2, and filter 31 filters out all frequencies except 67.125 MHz for channel 4. The other channel frequencies are provided in a similar manner. It will be seen that what is produced is a series of combs with a particular mathematical relationship, the combs being formed by channels 2 to 4, channels 5 and 6, channels C to G, and channels 9 to 13.

It is not necessary to produce the frequencies of channels H, I, 7 and 8 with this circuit, since they do not produce undesirable second order intermodulation products. These frequencies can conveniently be produced by crystals.

By use of three constants in the analytical expressions, it is possible to phase lock to three off-air channels. For example, it may be desirable to lock to channel 6, channel 10, and channel 13 two of which may be offset 0.01 MHz if desired.

In this case: channel $6 = 83.25$ MHz $= 14x + u - v$ channel $10 = 193.26$ MHz $= 32x + u + v$
channel $13 = 211.24$ MHZ $= 35x + U + v$ Solving these three equations:
$x = 5.99333$ MHz
$u = 0.408333$ MHz
$v = 1.065$ MHz Using these values, the re-assigned channel frequencies are calculated, as shown in table 4 which follows, the frequency shift also being shown:

TABLE 4

| Channel | Equation | Re-assigned Frequency (MHz) | Frequency Deviation (MHz) |
|---|---|---|---|
| 2 | $9x + v$ | 55.005000 | − .245000 |
| 3 | $10x + v$ | 60.998333 | − .251666 |
| 4 | $11x + v$ | 66.991666 | − .258333 |
| 5 | $13x + u - v$ | 77.256666 | + .006666 |
| 6 | $14x + u - v$ | 83.250000 | .000000 |
| C | $22x + u$ | 132.261666 | − .988333 |
| D | $23x + u$ | 138.255000 | − .995000 |
| E | $24x + u$ | 144.248333 | −1.001666 |
| F | $25x + u$ | 150.241666 | −1.008333 |
| G | $26x + u$ | 156.235000 | −1.015000 |
| H | $27x + u$ | 162.228333 | −1.021666 |
| I | $28x + u$ | 168.221666 | −1.028333 |
| 7 | $29x + u + v$ | 175.280000 | + .030000 |
| 8 | $30x + u + v$ | 181.273333 | + .023333 |
| 9 | $31x + u + v$ | 187.266666 | + .016666 |
| 10 | $32x + u + v$ | 193.260000 | + .010000 |
| 11 | $33x + u + v$ | 199.253333 | + .003333 |
| 12 | $34x + u + v$ | 205.246666 | − .003333 |
| 13 | $35x + u + v$ | 211.240000 | − .010000 |

Figure 2:
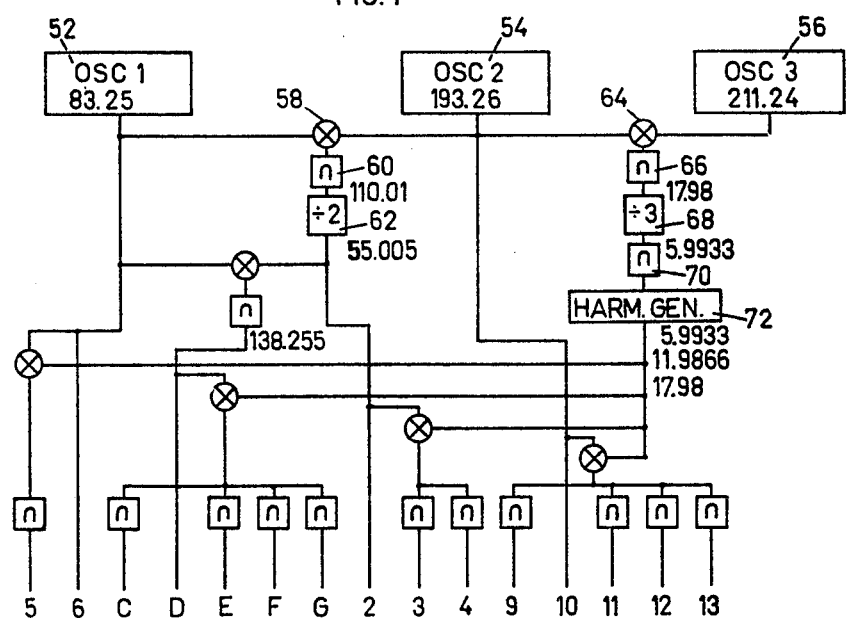
FIG. 2 is a block diagram showing how the carrier frequencies are converted, according to a second embodiment of the invention, where off-air phase lock is required.

The manner in which the various frequencies shown in table 4 are obtained in a master generator is shown in FIG. 2. Again, three oscillators are provided, in this instance oscillator 52 is provided with a frequency of 83.25 MHz, oscillator 54 with a frequency of 193.26 MHz, and oscillator 56 with a frequency of 211.24 MHz, namely the frequencies of channel 6, channel 10 and channel 13. The frequencies from oscillators 52 and 54 are combined in mixer 58, and the difference is filtered out by the filter 60, leaving the other frequency of 110.01 MHz. This is halved in divider 62, which gives a frequency of 55.005 MHz, which is the frequency of channel 2.

Similarly, the difference between oscillators 54 and 56 is provided by mixer 64 and filter 66, divided by three in divider 68, and filtered by filter 70, to produce a frequency of 5.9933 MHz, which is the wanted channel spacing "$x$". The output from filter 70 is passed into a harmonic generator 72 which supplies frequencies of 5.9933 MHz, 11.9866 MHz and 17.98 MHz. As before, these various frequencies are appropriately mixed and filtered in the manner indicated in FIG. 2 to produce the various channel frequencies. It is not believed necessary to individually indicate each mixer and filter by reference numerals in this instance.

Figure 3:
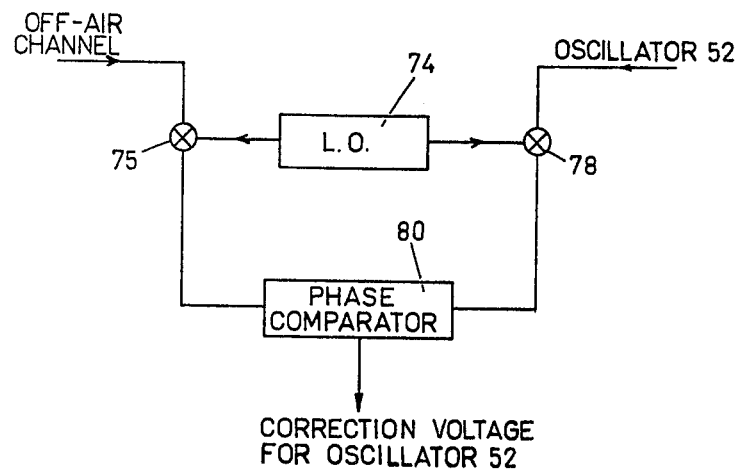
FIG. 3 is a block diagram showing a typical circuit for phase locking the oscillators to selected off-air frequencies.

The off-air locking is achieved by slaving the three basic oscillators 54, 52, and 56 to the respective three off-air carriers. This is done by phase comparison. Phase comparators generally operate at low frequency, and the high frequencies used in the television channels are therefore converted to low frequencies, for phase comparison, a typical circuit being shown in FIG. 3.

The output from a local oscillator 74 is mixed with the offair frequency in a mixer 75, and is mixed with the output from the respective basic oscillator in a mixer 78. The outputs from the mixers 75, 78 (with the "sum" products filtered out) are fed to a phase comparator 80, which operates on the balanced mixer principle and produces a correction voltage for the basic oscillator which pulls the basic oscillator into place. As shown, the off-air frequency is that of channel 6 to which the basic oscillator 52 is slaved. Similar circuits are provided for the oscillators 54, 56, which are slaved to off-air channels 1 and 13.

Figure 4:
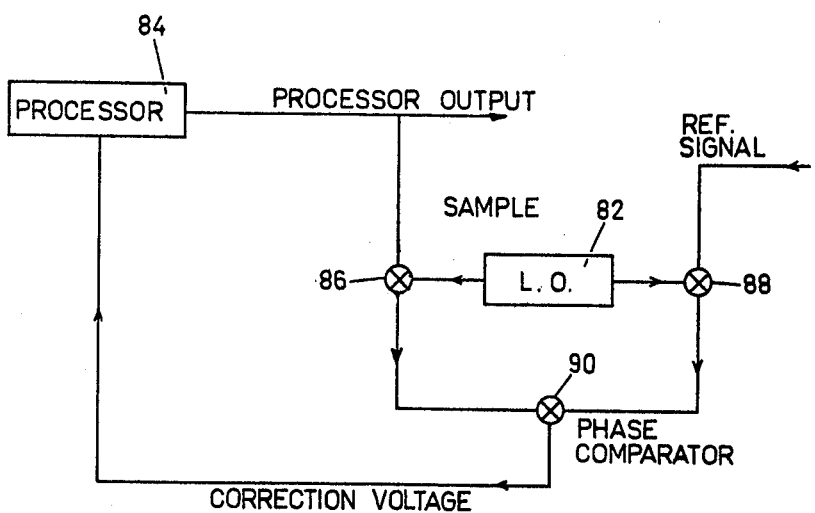
FIG. 4 is a block diagram showing a typical circuit for phase locking a signal to its reference carrier.

Similarily to locking the three basic oscillators to the three off-air signals, it is now possible to lock all signals to be distributed to their respective carriers, by feeding an appropriate correction voltage to the appropriate local oscillator of the converter in the processor at the head end of the cable television system. A suitable circuit is shown in FIG. 4.

Again, frequency reduction is achieved by subtracting the frequency of a local oscillator 82 from the reference signal frequency, and from the sample from the processor 84 at the head end of the cable television system in mixers 86, 88 respectively, with phase comparison being made by a phase comparator 90, the correction voltage from which is fed to the respective local oscillator in the processor.

Figure 5:
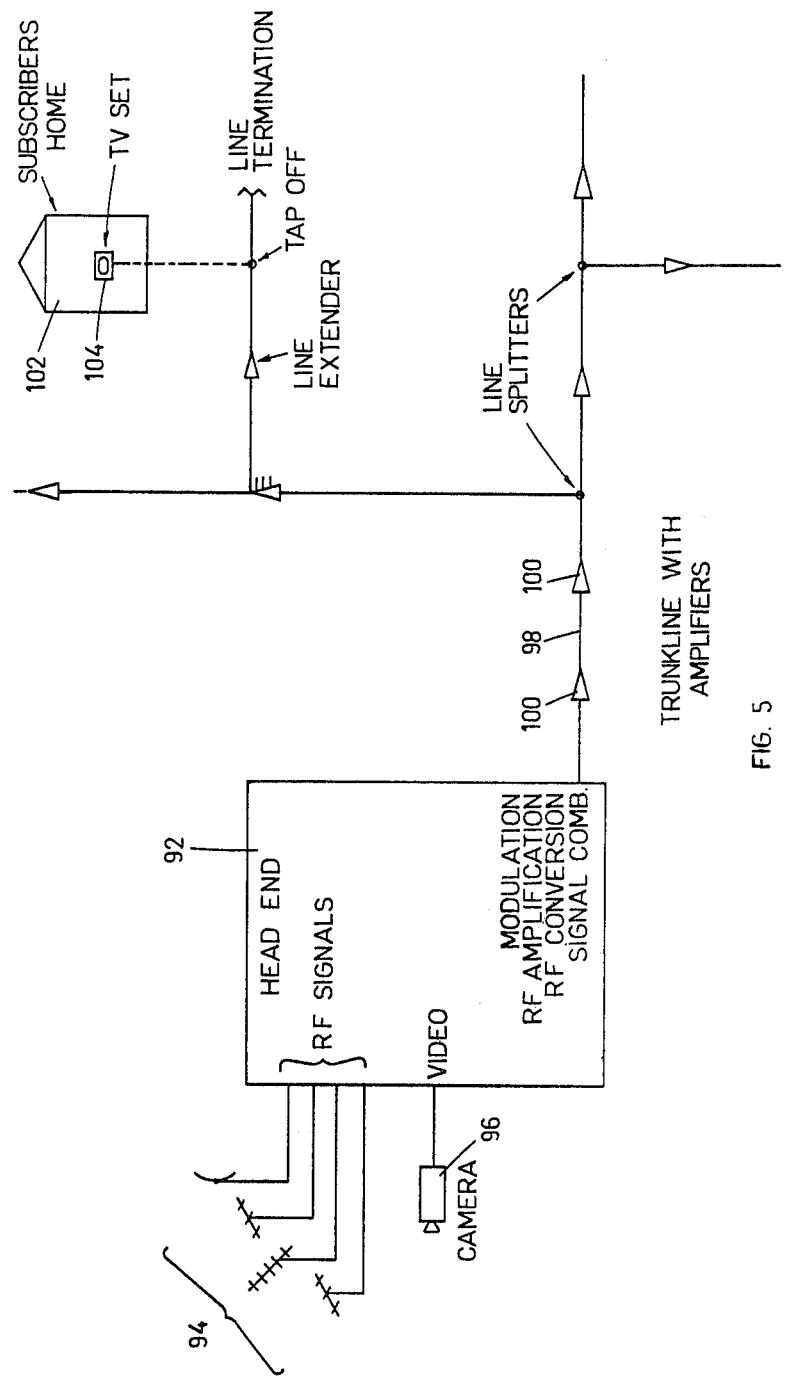
FIG. 5 is a block diagram showing a typical cable television transmission system.

To complete the description of the embodiments of the invention, the application to a standard cable television transmission system will now be briefly described, with reference to FIG. 5.

FIG. 5 shows a head end 92 which receives television signals from various transmitters operating on various frequencies by means of respective antennae 94. The cablevision station may for example also have its own channel, represented by camera 96. From the head end 92, a trunk line 98 with amplifiers 100 is split into various lines as required to supply the signals to domestic television receivers in subscribers' homes, one home 102 with a television receiver 104 being shown.

In the head end, the television signals of the various channels, which are of course in the radio frequency (RF) band, are each converted from the original frequencies to the re-assigned frequencies according to the invention, and then are sent out along the trunk lines 98, after the usual stages of modulation, RF amplification, RF conversion and signal combination.

It will be understood that the invention is not limited to the transmission of signals by cable, nor to the transmission of radio or television programs. Further, various alternatives to the described embodiments, within the scope of the invention, will be apparent to the man skilled in the art, the scope of the invention being defined by the appended claims.

What I claim as my invention is:

1. A cable television system for reducing second order intermodulation products caused by interaction between carriers in non-linear electrical devices in the system wherein the carrier frequencies of the channels shown in the first column of the following table are re-assigned as expressed in analytical form in the fourth column of the table, the standard frequencies given in the second column being expressable in analytical form as shown in the third column of the table where $x = 6$ and $y = 0.25$, and the values of $x$ and $y$ for the re-assigned frequencies being found by selecting frequencies for two channels, setting them equal to the corresponding expressions in the fourth column to form two simultaneous equations, and solving for $x$ and $y$:

TABLE

| Channel | Freq. MHz | Standard | New Assignment |
|---|---|---|---|
| 2 | 55.25 | $9x + 5y$ | $9x + 5y$ |
| 3 | 61.25 | $10x + 5y$ | $10x + 5y$ |
| 4 | 67.25 | $11x + 5y$ | $11x + 5y$ |
| 5 | 77.25 | $13x - 3y$ | $13x - 3y$ |
| 6 | 83.25 | $14x - 3y$ | $14x - 3y$ |
| C | 133.25 | $22x + 5y$ | $22x + 2y$ |
| D | 139.25 | $23x + 5y$ | $23x + 2y$ |
| E | 145.25 | $24x + 5y$ | $24x + 2y$ |
| F | 151.25 | $25x + 5y$ | $25x + 2y$ |
| G | 157.25 | $26x + 5y$ | $26x + 2y$ |
| H | 163.25 | $27x + 5y$ | $27x + 2y$ |
| I | 169.25 | $28x + 5y$ | $28x + 2y$ |
| 7 | 175.25 | $29x + 5y$ | $29x + 7y$ |
| 8 | 181.25 | $30x + 5y$ | $30x + 7y$ |
| 9 | 187.25 | $31x + 5y$ | $31x + 7y$ |
| 10 | 193.25 | $32x + 5y$ | $32x + 7y$ |
| 11 | 199.25 | $33x + 5y$ | $33x + 7y$ |
| 12 | 205.25 | $34x + 5y$ | $34x + 7y$ |
| 13 | 211.25 | $35x + 5y$ | $35x + 7y$ | said system comprising two oscillator means for generating the frequencies of said two channels, means for combining the two generated frequencies to produce a third frequency, -- is inserted after the comma; a harmonic generator means for generating a channel spacing frequency and harmonics thereof, and means for combining and filtering frequencies from the two oscillator means, said third frequency and the harmonic generator means to derive other re-assigned channel frequencies.

2. A system as claimed in claim 1 wherein said oscillator means generate frequencies corresponding to channels 3 and E and said harmonic generator means generates frequencies of 6, 12 and 18 MHz.

3. A system as claimed in claim 1 wherein the frequencies of said two channels are standard frequencies.

4. A system as claimed in claim 3 including means for phase-locking the frequencies of said two channels to off-air signals of corresponding frequency.

5. A cable television system for reducing second order intermodulation products caused by interaction between carriers in non-linear electrical devices in the system wherein the carrier frequencies of the channels shown in the first column of the following table are re-assigned so that they have the frequencies shown in the third column and are expressable in analytical form as shown in the second column and where $x$, $u$ and $v$ are constants having the values 6, 0.25 and 1.125, respectively:

TABLE

| Channel | Equation | Re-assigned Frequency (MHz) | Frequency Deviation (KHz) |
|---|---|---|---|
| 2 | $9x + v$ | 55.125 | $-125$ |
| 3 | $10x + v$ | 61.125 | $-125$ |
| 4 | $11x + v$ | 67.125 | $-125$ |
| 5 | $13x + u - v$ | 77.125 | $-125$ |
| 6 | $14x + u - v$ | 83.125 | $-125$ |
| C | $22x + u$ | 132.250 | $-1000$ |
| D | $23x + u$ | 138.250 | $-1000$ |
| E | $24x + u$ | 144.250 | $-1000$ |
| F | $25x + u$ | 150.250 | $-1000$ |
| G | $26x + u$ | 156.250 | $-1000$ |
| H | $27x + u$ | 162.250 | $-1000$ |
| I | $28x + u$ | 168.250 | $-1000$ |
| 7 | $29x + u + v$ | 175.375 | $+125$ |
| 8 | $30x + u + v$ | 181.375 | $+125$ |
| 9 | $31x + u + v$ | 187.375 | $+125$ |
| 10 | $32x + u + v$ | 193.375 | $+125$ |
| 11 | $33x + u + v$ | 199.375 | $+125$ |
| 12 | $34x + u + v$ | 205.375 | $+125$ |
| 13 | $35x + u + v$ | 211.375 | $+125$ | said system comprising first, second and third oscillators for generating first, second and third re-assigned channel frequencies, means for combining said first frequency with said second frequency and said second frequency with said third frequency to produce fourth and fifth frequencies, means for producing harmonics of said fifth frequency, and means for combining and filtering the first, second, third, fourth and fifth frequencies and harmonics to produce the other reassigned channel frequencies.

6. A cable television system for reducing second order intermodulation products caused by interaction between carriers in non-linear electrical devices in the system wherein the carrier frequencies of the channels shown in the first column of the following table are re-assigned so that they are expressable in analytical form as shown in the fourth column, the standard frequencies given in the second column being expressable in analytical form as shown in the third column of the table where $x = 6$ and $y = 0.25$, the values of $x$, $u$ and $v$ for the re-assigned frequencies being found by selecting frequencies for three channels, setting them equal to the corresponding expressions in the fifth column to form three simultaneous equations, and solving the equations for x, u and v:

TABLE

| Channel | Freq. MHz | Standard | Re-assigned Frequency (MHz) | Equation |
|---|---|---|---|---|
| 2 | 55.25 | $9x + 5y$ | 55.125 | $9x + v$ |
| 3 | 61.25 | $10x + 5y$ | 61.125 | $10x + v$ |
| 4 | 67.25 | $11x + 5y$ | 67.125 | $11x + v$ |
| 5 | 77.25 | $13x - 3y$ | 77.125 | $13x + u - v$ |
| 6 | 83.25 | $14x - 3y$ | 83.125 | $14x + u - v$ |
| C | 133.25 | $22x + 5y$ | 132.250 | $22x + u$ |
| D | 139.25 | $23x + 5y$ | 138.250 | $23x + u$ |
| E | 145.25 | $24x + 5y$ | 144.250 | $24x + u$ |
| F | 151.25 | $25x + 5y$ | 150.250 | $25x + u$ |
| G | 157.25 | $26x + 5y$ | 156.250 | $26x + u$ |
| H | 163.25 | $27x + 5y$ | 162.250 | $27x + u$ |
| I | 169.25 | $28x + 5y$ | 168.250 | $28x + u$ |
| 7 | 175.25 | $29x + 5y$ | 175.375 | $29x + u + v$ |
| 8 | 181.25 | $30x + 5y$ | 181.375 | $30x + u + v$ |
| 9 | 187.25 | $31x + 5y$ | 187.375 | $31x + u + v$ |
| 10 | 193.25 | $32x + 5y$ | 193.375 | $32x + u + v$ |
| 11 | 199.25 | $33x + 5y$ | 199.375 | $33x + u + v$ |
| 12 | 205.25 | $34x + 5y$ | 205.375 | $34x + u + v$ |
| 13 | 211.25 | $35x + 5y$ | 211.375 | $35x + u + v$ | said system comprising first, second and third oscillators for generating first, second and third channel frequencies, means for combining said first frequency with said second frequency and said second frequency with said third frequency to produce fourth and fifth frequencies, means for producing harmonics of said fifth frequency, and means for combining and filtering the first, second, third, fourth and fifth frequencies and harmonics to produce the other re-assigned channel frequencies.

7. A system as claimed in claim 6 wherein said first, second and third frequencies are standard frequencies.

8. A system as claimed in claim 7 including means for phase-locking said first, second and third frequencies to off-air signals of corresponding frequency.

* * * * *